April 9, 1957 H. BOLZMANN 2,788,509
ECHO SOUNDING APPARATUS
Filed Nov. 19, 1952 4 Sheets-Sheet 1

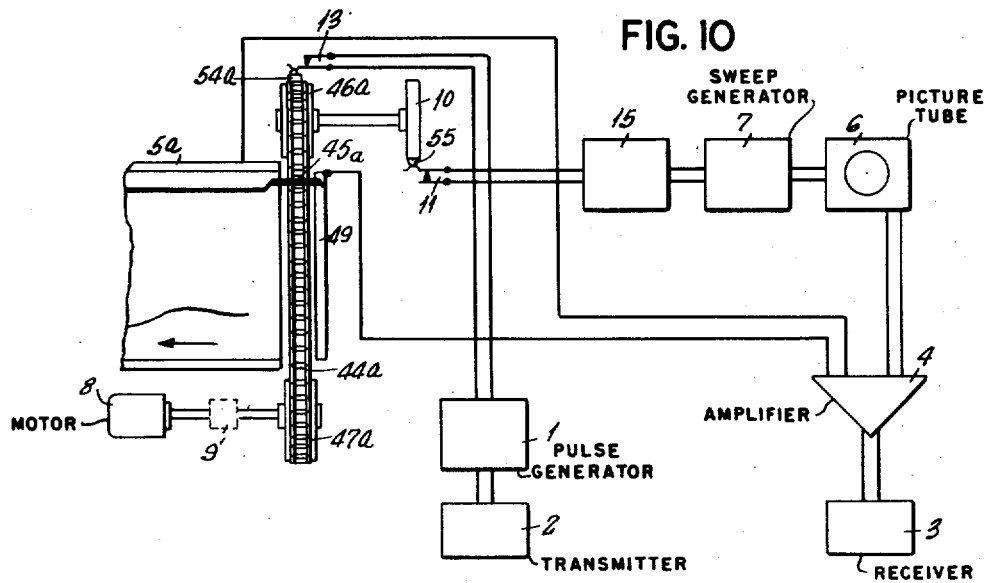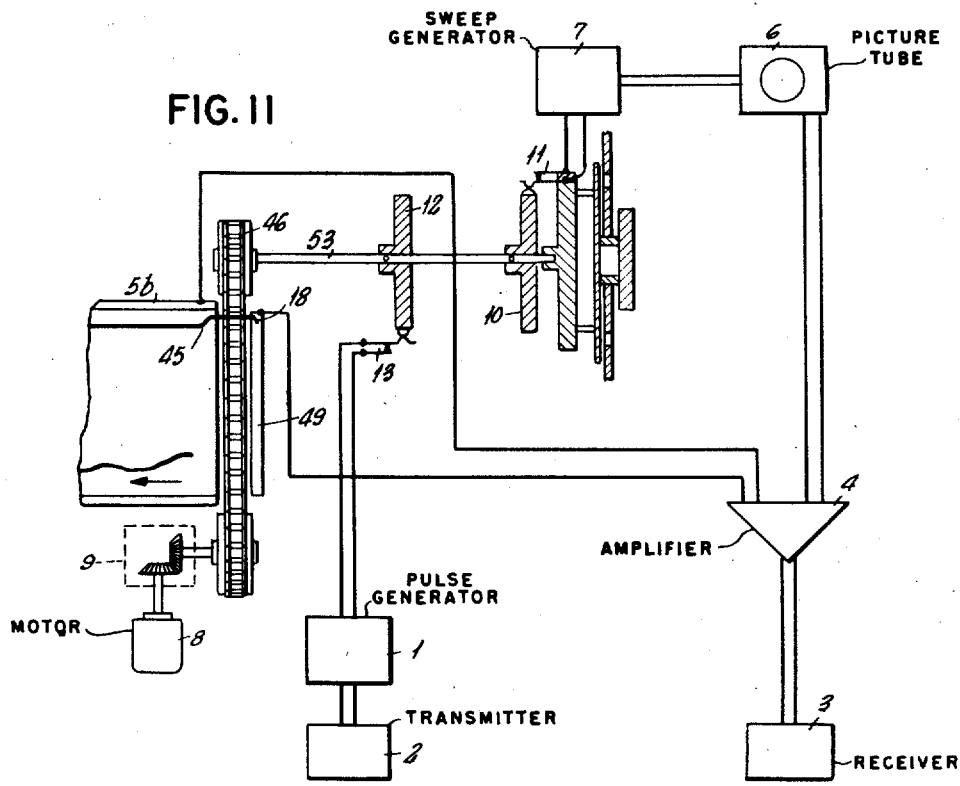

2,788,509
Patented Apr. 9, 1957

2,788,509
ECHO SOUNDING APPARATUS

Hans Bolzmann, Kiel, Schleswig-Holstein, Germany, assignor to Electroacustic Gesellschaft mit beschränkter Haftung, Kiel, Germany, a corporation of Germany Application November 19, 1952, Serial No. 321,354

Claims priority, application Germany November 20, 1951

18 Claims. (Cl. 340—3)

My invention relates to echo sounding apparatus operating with sonic or supersonic sound waves, for instance, for detecting and locating underwater objects such as fish or schools of fish.

It is an object of my invention to devise echo sounding means, particularly for the purposes of the fishing industry, that provide a record of observations made over a wide sounding range during long periods of time in conjunction with a simultaneous pictorial indication of a partial range so as to permit, without break in the continuous long-range observation, a selective focussing upon details, for instance, of a school of fish or individual fish.

To this end, and in accordance with a feature of my invention, I provide an echo sounding apparatus with a recording instrument, such as a writing-type soundings recorder, in combination with a cathode-ray oscillograph and join both with the same circuit means for transmitting and receiving the sounding pulses, and I further connect the mechanical drive of the recording instrument with the sweep generator of the cathode-ray tube thus synchronizing the tube operation with the writing operation of the recording instrument.

With such a simultaneous operation of a soundings recorder and a cathode ray tube, the part of the total sounding range shown on the picture screen of the tube can readily be kept smaller than the total range being supervised by the recording instrument. Now, according to another feature of my invention, I provide adjustable time delay means between the recorder drive and the sweep generator of the cathode-ray tube so that the starting moment of the sweep interval can be shifted relative to the recurrent starting moment of the diagram record being written by the recorder. As a result, the partial sounding range shown on the tube can be shifted relative to the larger sounding range recorded on the diagram.

Echo sounding apparatus with a writing instrument for recording the soundings on a diagram sheet are known as such. Likewise known are echo sounding apparatus equipped with a cathode-ray tube. An apparatus suitable in conjunction with the present invention for representing a selected partial range of the available total sounding range on the picture screen of a cathode ray tube is disclosed in my copending application Serial No. 174,738, filed July 19, 1950, now Patent No. 2,757,354, and assigned to the assignee of the present invention. It will be understood from the foregoing that, in principle, such known recording devices and such previously proposed picture-tube apparatus may be used for the purposes of the present invention by combining the drive of the recorder mechanism with the sweep generator of the picture tube to make the two devices operate in synchronism, and by interposing between the drive and the sweep generator a selectively adjustable timing device to permit shifting the periodic operating or sweep intervals of the tube relative to the periodic starting moment of the recording operation.

According to another feature of my invention a single drive motor, preferably an electric motor, is used for jointly controlling the pulse generator transmitting the sounding pulses, for driving the writing device of the recording instrument, and also for triggering the sweep generator of the cathode ray tube. With such an organization, the two indicating devices may be located close to each other, preferably within a common housing, so that the screen picture of the tube appears in proximity to the diagram record and can be viewed while the diagram record is also being observed.

The delayed triggering of the sweep generator, and hence the control of the recurrent moment at which the cathode ray tube starts to be ready for reception and indication of echo signals, may be effected by either a mechanical device or by means of an electronic time-delay circuit.

With a mechanical design of the time-delay device, the cathode-ray tube is placed in readiness for indication by the actuation of an adjustable switch contact which is controlled by the common drive, such as the above mentioned electric motor, and which releases the sweep generator for issuing a single-stroke of saw-tooth shaped sweep voltage to the deflector plates of the tube.

When providing an electronic time-delay device, this device is interposed between the instrument drive and the sweep generator and is controlled by a switch contact actuated by the instrument drive. After the elapse of an adjustable interval of time from the actuating moment of the contact, the electronic device issues a triggering pulse which places the picture tube in readiness by triggering the sweep generator, the adjustable time delay being controlled by electronic means.

The foregoing and other objects and features of my invention will be apparent from, or will be referred to in, the following description of the embodiments of my invention exemplified by the drawings in which.

Figure 1:
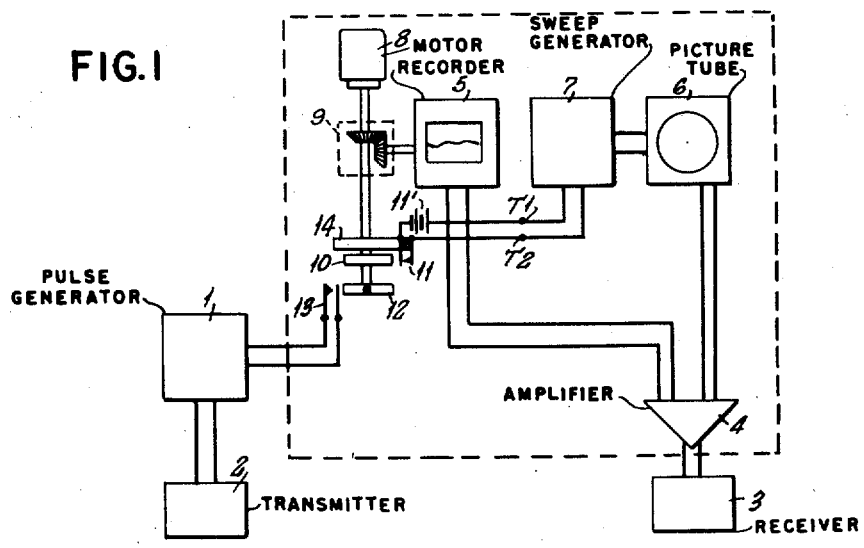
Fig. 1 is a schematic diagram of an echo sounding apparatus with a mechanical device for controlling the trigger delay of the cathode-ray tube.
Figure 2:
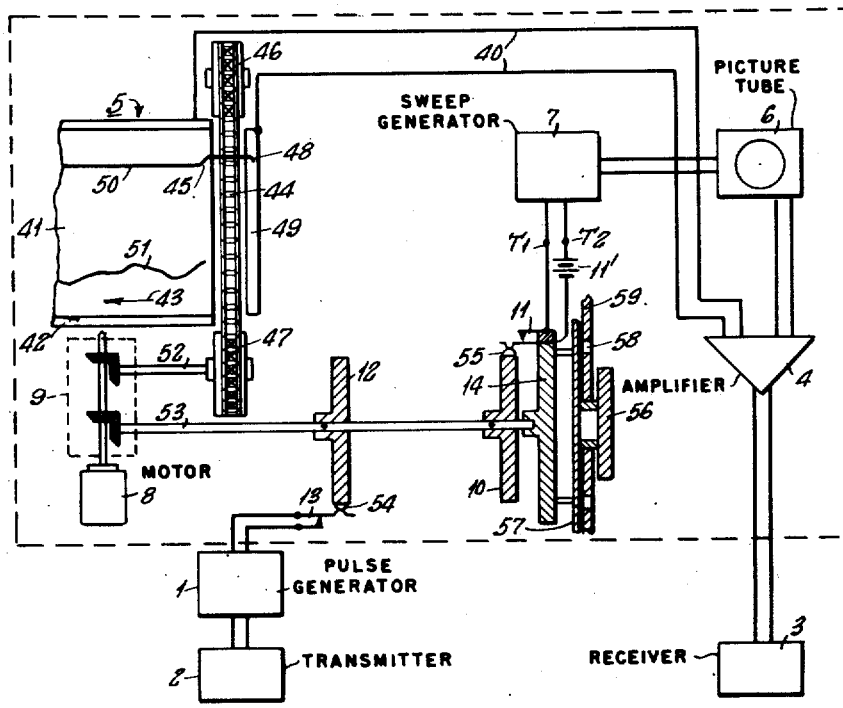
Fig. 2 is a schematic illustration of substantially the same system, showing part of the mechanical components on a larger scale than in Fig. 1 and in a somewhat modified design.
Figure 6:
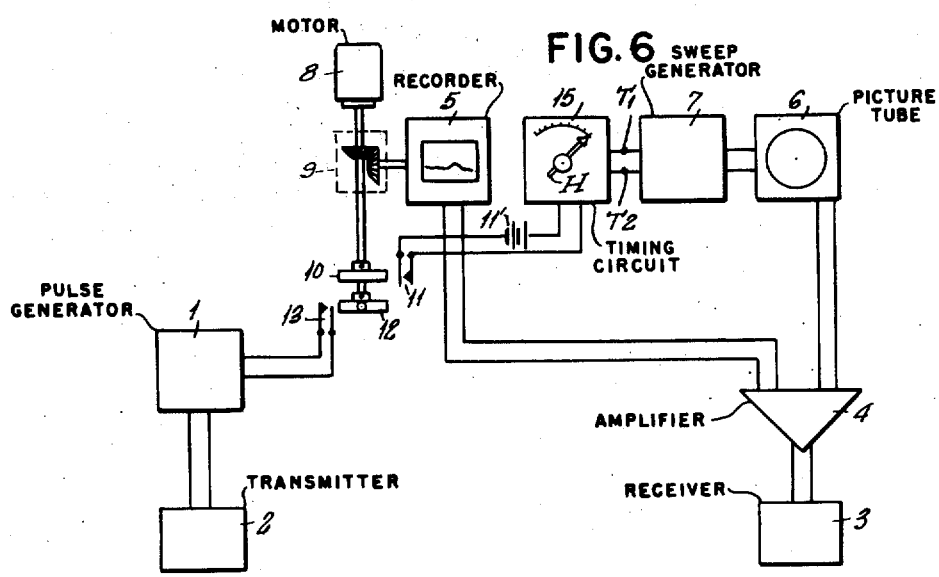
Fig. 6 shows a schematic diagram of an echo sounding apparatus similar to that of Fig. 1 but equipped with an adjustable timing device of the electronic type instead of the mechanical timing device in the apparatus of Fig. 1.
Figure 7:
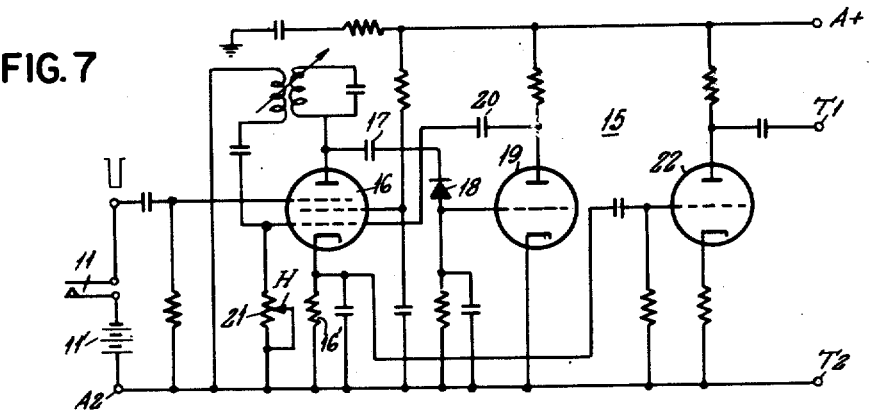
Figure 8:
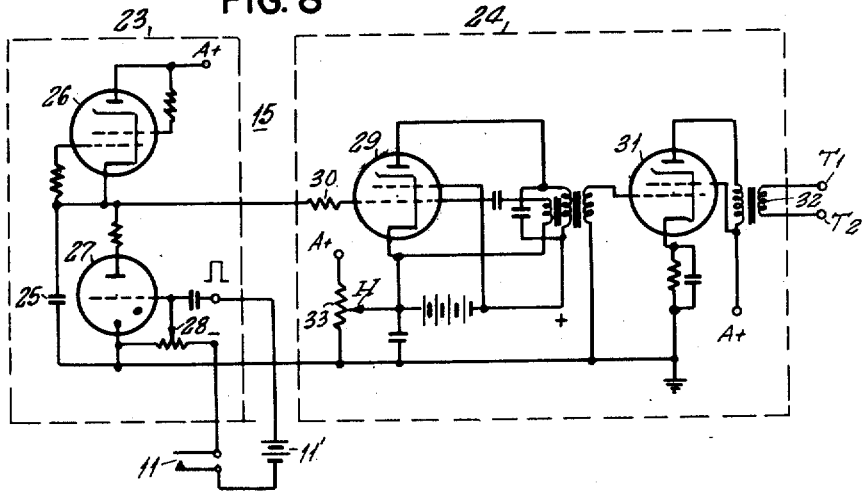
Figure 9:
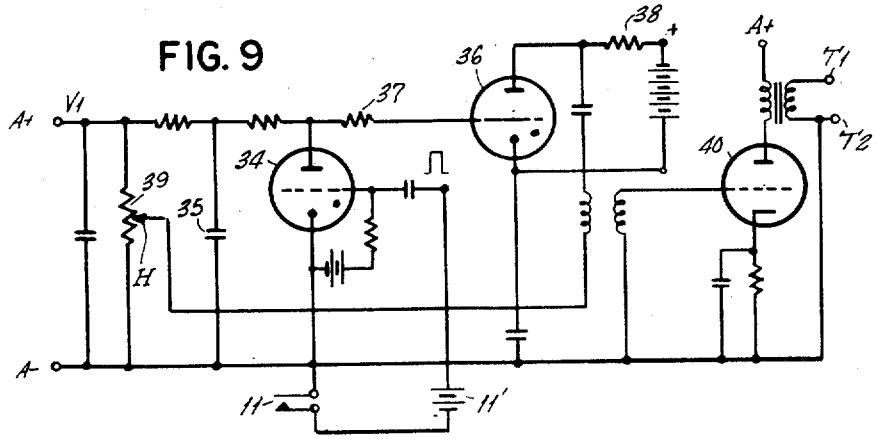

Figs. 7, 8, and 9 show respective circuit diagrams of three different electronic timing devices applicable in apparatus according to Fig. 6;

Fig. 10 shows another embodiment of an echo sounding apparatus with an electronic timing device; and Fig. 11 illustrates another modification of an apparatus generally comparable with those of Figs. 1 and 2.

According to Fig. 1, the transmitting means of the illustrated echo sounding apparatus comprise a pulse generator 1 and a pressure-wave transmitter 2 connected to the generator. The transmitter 2 may be designed as a magnetostrictive transformer to operate in or near the supersonic range. A pressure-wave receiver 3, which may also be designed on the magnetostrictive principle, is connected to an amplifier 4. One output circuit of amplifier 4 is connected with the writing device of a recording instrument 5. Another output circuit of amplifier 4 is connected to a cathode-ray picture tube 6. A sweep generator 7 connected to the picture tube 6 places it in receptive condition by issuing a sweep voltage in response to a trigger pulse applied to the input terminals T1 and T2. The recording mechanism of the instrument 5 is driven by an electric motor 8 through a gearing 9. Also driven through gearing 9 is a cam shaft with two cam discs 10 and 12. Cam disc 10 has at one point of its periphery a cam nose for actuating a contact 11 mounted on a disc 14. Disc 14 is shown traversed by the shaft of cam discs 10 and 12 but is revolvable about the shaft into any desired angular position. Hence, contact 11 is closed at a selectively adjustable phase point relative to the cycle of cam revolution. A cam nose on disc 12 actuates a contact 13 which periodically releases the pulse generator 1. Contact 13 may have a fixed position.

It will be recognized that the pulse generator 1, periodically released by the closing of contact 13, causes the transmitter 2 to issue repetitive pressure pulses. The reflected pulses arriving at the receiver 3 then control the recording instrument 5 as well as the picture tube 6 to produce corresponding indications. However, while the periodic writing operation of the recorder commences at the moment of fixed phase position relative to the period of the transmitted sounding pulses, the picture tube 6 becomes receptive only after the elapse of a timing interval lasting from the moment when fixed contact 13 is closed to the selectively adjusted moment when the control contact 11 is temporarily closed.

The control contact 11, when closed, connects a suitable voltage source, here schematically represented at 11', across the input terminals T1, T2 of the sweep generator 7 thus triggering the sweep generator to issue a single-stroke sweep voltage to the tube. The duration of this voltage pulse is much shorter than the cycle period of the recording instrument. That is, the duration of the voltage pulse is so short that the picture tube 6 remains in receptive condition during a short interval of time corresponding to an only small partial range of the sounding range under supervision by the recording instrument 5. For instance, if the sounding range covered by the recorder 5 is zero to 600 meters, the picture screen of tube 6 may indicate a sectional range, for instance, of 25 meters. The starting point of this sectional range may be shifted at will relative to the recorder range by correspondingly changing the angular adjustment of the disc 14. It is not necessary to have the recording instrument 5 always cover the maximum available sounding range; for instance, it may be adjusted to a partial range of say 300 to 600 meters or to any other partial range taken out of the maximum range to which the echo-sounding apparatus may be made responsive. The range adjustment of the recording instrument 5 can be accomplished by changing the speed of stylus travel over the recording paper in unit multiples (so that sweep speed will be increased in unit multiples). Stylus speed can be changed by changing the gear ratio of the gearing 9. However, the range covered by the recording instrument 5 is generally larger than the range indicated on picture tube 6. It is likewise not necessary to have the maximum sounding distance for the recording instrument coincide with the maximum sounding distance obtainable with the cathode-ray tube.

An apparatus in which, as described, all component devices are synchronized by means of a common drive 8 is especially favorable when the recording instrument 5 and the cathode ray tube 6 are to be disposed in immediate proximity. The individual devices may then be placed into a common housing, indicated by a broken line in Fig. 1, except for the transmitting devices 1 and 2 and the pressure-wave receiver 3 which are located outside and usually remote from the housing, for instance, near the keel of a ship.

The above described operation of the apparatus will be more fully understood from the somewhat modified embodiment shown in Fig. 2. The recording instrument 5, partially illustrated in Fig. 2, is of the type in which a stylus is moved periodically and at uniform speed over a recording tape moving perpendicularly to the travel direction of the stylus, the recording marks being produced by impressing a voltage pulse through the stylus across the thickness of the recording tape. The recording tape, shown at 41, is electro-responsive so that the voltage pulse causes a dot to appear on the record surface. The tape 41 passes at a uniform speed over a surface member 42 of metal in the direction of the arrow 43. The stylus 45 is mounted on an endless carrier 44, consisting, for instance, of a chain or belt, which extends around two sheaves or sprocket wheels 46 and 47. The sprocket 47 is driven without slip and at uniform speed.

A slide contact 48 is joined with the stylus 45 and slides along a contact bar 49 as the stylus travels across the recording tape 41. The contact bar 49 and the backing member 42 are connected by respective leads 40 with the amplifier 4. When the receiver 3 responds to an echo of a pulse issued by the transmitter 2, a correspondingly amplified voltage appears in the output circuit of the amplifier 4 and is impressed between the stylus 45 and the backing member 42. This produces a dot on the diagram surface of the electro-responsive tape. During each of the consecutive periods of stylus passage at least two such dots are produced. One dot appears at the recurrent moment when the receiver 3 responds to a pulse issuing from the transmitter 2 under control by the contact 13. Thus a normally straight zero line 50 is recorded on tape 51 during a sequence of stylus passages. At the moment when an echo is received, another dot is produced during each stylus passage, and this dot appears on the tape at a distance from the zero line. The echo dots may form together one or several lines, such as the one denoted by 51. For obtaining a close spacing between the individual recorded dots two or three styluses may be mounted on the endless carrier 44 so that when one stylus reaches the end of its passage the next stylus is about to commence its travel across the tape surface.

In the embodiment of Fig. 2 the stylus travel is synchronized with the operation of the pulse generator and of the sweep generator by having the shaft 52 of the sprocket wheel 47 driven through the gearing 9 from the motor 8. The release of the sounding pulses is effected by a shaft 53 which is driven from gearing 9 and carries the cam disc 12. A cam nose 54 on disc 12 actuates the transmitter contact 13 in the manner described with reference to Fig. 1. The sweep generator 7 is controlled by the cam disc 10 which is also mounted on shaft 53 and has a cam nose 55 for actuating the control contact 11.

Contact 11 is mounted on a revolvable disc 14 which is coaxial to shaft 53 but not coupled therewith. The disc 14 may be turned manually by means of a knob 56. Rigidly connected with the revolvable disc 14 is a member 57 which carries a circular scale calibrated, for instance, in meters of sounded depth. A window 58 in the housing wall 59 of the apparatus permits reading the sounding depth of the partial sounding range to which the disc 14 is adjusted, this range being indicated on the picture screen of the tube 6.

With the illustrated adjustment of the apparatus, contact 13 for the release of the pulse generator 1 and contact 11 for triggering the sweep generator 7 close simultaneously. Then the partial sounding range appearing on the screen of the picture tube 6 commences at zero sounding depth.

Figure 3:
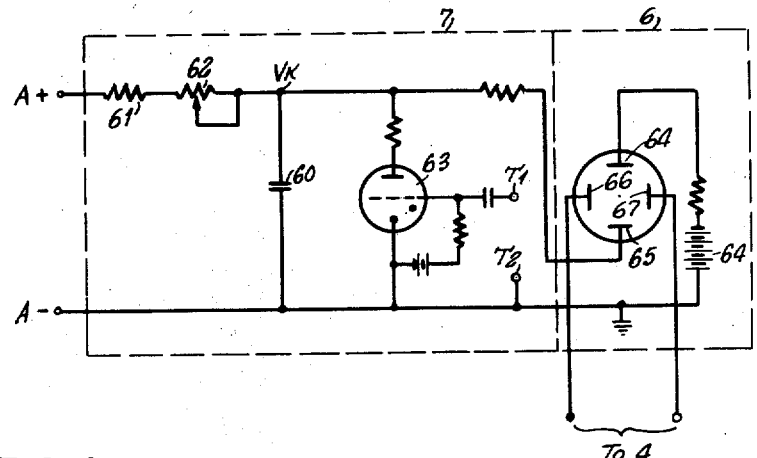
Fig. 3 is a circuit diagram exemplifying an especially simple design of a sweep generator and a picture-tube circuit applicable in echo sounding apparatus according to Figs. 1 and 2, and also in apparatus of the type shown in Fig. 6.

Fig. 3 shows an example of the circuit diagram of an especially simple design of the sweep generator 7. According to Fig. 3, a capacitor 60 is connected through a fixed resistor 61 and an adjustable resistor 62 to a voltage source of a sufficiently high voltage $V_k$. The capacitor is normally charged to this voltage $V_k$. A gaseous discharge tube 63, such as a thyratron, is connected parallel to capacitor 60 and is blocked by a negative grid bias when the capacitor is fully charged. When a positive releasing pulse is applied to the grid of tube 63, the tube is temporarily ignited thus discharging the capacitor. Immediately thereafter the capacitor 60 recharges, and the resulting increasing voltage across the capacitor is applied between the deflector plates 64 and 65 of the picture tube 6 to serve as a sweep voltage. The plates 66 and 67 of tube 6 are connected to the amplifier 4 (Fig. 1, Fig. 2 or Fig. 6). The trigger pulse for tube 63 is supplied from terminals T1 and T2 which are identical with the correspondingly denoted terminals in Fig. 1 or 2. The terminals denoted by A+ and A— (in Fig. 3 and Figs. 6 to 9) denote respectively the positive and negative terminals or leads of a suitable supply of constant plate voltage.

Figure 4:
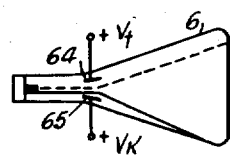
Figs. 4 and 5 are explanatory and show, respectively, a cathode ray picture tube and a time characteristic of the sweep voltage applied to the sweep deflector plates of the tube.

In Fig. 4 the cathode ray of picture tube 6 is shown by a full line in its lowermost position which corresponds to the rest position. Also shown by a broken line is the highest position of the ray. Due to the positive bias voltage $V_k$ impressed upon the lower deflector plate 65 (Fig. 3) the cathode ray, when in its rest position, does not impinge upon the picture screen but is held downwardly away from the screen. When the tube 63 is being triggered, the ray jumps to the top of the screen at such a high speed that virtually no visible indication is effected. The ray then temporarily occupies the position shown by the broken line, this position being determined by the fixed positive bias voltage $V_f$ of the upper deflector plate 64 (Fig. 3). The voltage $V_f$, taken from a direct-voltage source 64, is so dimensioned that the picture point in its uppermost position lies close to the upper edge of the picture screen. During the subsequent, nearly linear increase of the sweep voltage across the capacitor 60, the ray travels downwardly back to its initial position. During the interval of time in which the beam passes across the picture screen, the tube is in receptive condition so that any voltage from amplifier 4 impressed across plates 66 and 67 will produce an image.

Figure 5:
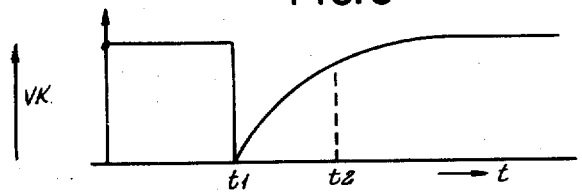

The just-mentioned course of the sweep voltage across capacitor 60 is schematically represented in the voltage-time diagram of Fig. 5. During rest condition, the voltage has the constant positive value $V_k$. At the trigger moment $t_1$, at which the tube 63 becomes conductive due to the closing of control contact 11, the sweep voltage drops abruptly to zero. The subsequently increasing voltage corresponds to the charging characteristic of capacitor 60. A nearly linear portion of the increasing voltage, extending up to the time point $t_2$, is preferably utilized as the sweep voltage for the picture tube.

In the embodiment illustrated in Fig. 6 the delayed release of the sweep circuit 7 is effected by an electronic time delay device 15. In this apparatus the contact 11 for controlling the release of the timing device 15 has a fixed position. In other respects the embodiment is similar to that of Fig. 1, the same reference numerals being used in both illustrations for denoting respectively similar components.

The device 15 in Fig. 6 is shown to have a manually settable member H for selectively varying the delay interval. Member H is identical or connected with the adjusting element of a timing circuit, usually the displaceable tap contact of a rheostat, as will be apparent from the embodiments shown in Figs. 7 to 9. For identification, therefore, the letter H is also applied in Figs. 7 to 9 to the adjustable element whose selected setting determines the duration of the delay. Also for comparison with Fig. 6, the control contact 11 and the pertaining voltage source 11' are duplicated in the circuit diagrams of the embodiments of the electronic timing device shown in Figs. 7 to 9.

According to Fig. 7, the timing device 15 is equipped with a vacuum tube 16, preferably of the multi-grid type, which serves essentially as a pulse generator. The tube 16 is triggered by a negative pulse. Such a trigger pulse can be produced by the closing of contact 11, for instance, in such a manner that this contact connects a negative voltage source (11') during a short-lasting interval of time to the input circuit of the timing device, i. e. to the suppressor grid circuit of the generator tube 16. A second vacuum tube 19 is coupled with tube 16 through a capacitor 17 and a rectifier 18. The anode of tube 19 is coupled through a capacitor 20 to a timing circuit connected with the control grid of tube 16. The tube 19 is non-conductive when the generator tube 16 is oscillating, and conducts current when the generator tube 16 is quiescent. The timing circuit in the grid circuit of the tube 16 has a variable time constant adjustable by means of a regulating resistor 21 whose setting determines the period of delay elapsing between the blocking of generator tube 16 due to the negative trigger pulse impressed upon its suspressor grid and the subsequent release of the tube. A further tube 22 serves to increase the steepness of the negative voltage drop occurring across the cathode resistor 16' of tube 16 when the oscillations of tube 16 reappear. This voltage drop of cathode resistor 16' is thus transformed by tube 22 into a steep positive pulse. The positive voltage pulse is taken from the anode of tube 22 and applied across the terminals T1 and T2 of the sweep generator with a time delay corresponding to the selected adjustment of resistor 21. The negative voltage pulses occurring across tube 22 at the cutoff moment of tube 16 have no effect upon the triggering of the sweep generator since this voltage acts only to further increase the cutoff bias of the sweep generator.

In the embodiment of the electronic timing device shown in Fig. 8, a saw-tooth generator denoted as a whole by 23 is connected with a pulse generator denoted by 24. The saw-tooth generator 23 comprises a capacitor 25 in series connection with a pentode 26 serving as a charging resistor. Parallel connected to capacitor 25 is a grid-controlled gas discharge tube 27, such as a thyratron whose negative grid bias can be adjusted by a rheostat 28 so that normally the tube 27 is continuously cut off. The release of tube 27 is effected by supplying a positive voltage pulse to its grid thus igniting the tube to momentarily discharge the capacitor 25 through the tube. During the subsequent recharging of capacitor 25, a single saw-tooth voltage wave is produced across the capacitor 25 and hence across the output leads of the saw-tooth generator 23. The single-stroke voltage pulse is supplied to the grid circuit of a tube 29 in the input stage of the pulse generator 24. The tube 29, consisting preferably of a pentode, has its plate circuit feedback-connected to the grid circuit and is so adjusted that a self-excitation of oscillations is possible only within a relatively narrow range of the grid-bias voltage. The narrow limitations of the self-oscillating range is obtained by operating the tube with a low anode voltage, for instance of 20 volts, so that the characteristic of anode current versus grid voltage has a very small amplitude within the range of the negative grid bias voltage. Then, when supplying a variable grid voltage, a self-excitation of the oscillator can occur only when the potential between grid and cathode of tube 29 is approximately equal to zero. With a positive grid voltage the oscillations are suppressed by the then occurring grid current. If the saw-tooth voltage from across the recharging capacitor 25 is impressed upon the grid of tube 29 through a high-ohmic resistor 30, a short lasting high-frequency voltage pulse occurs in the output circuit of this tube. Since, due to the low anode voltage, the amplitude of the high-frequency pulse is comparatively small, it is further amplified by a tube 31 so that a triggering pulse of large amplitude is available at terminals T1 and T2 of the output circuit 32 for releasing the sweep generator of the cathode-ray tube.

The time delay between the ignition of the gaseous discharge tube 27 in the saw-tooth generator 23 and the pulse appearing in the output circuit 32 of the pulse generator 24 can be varied by changing the fixed grid bias voltage of tube 29 with the aid of the control rheostat 33, i. e. by displacing the tap contact H. The calibration of the saw-tooth generator 23 is not affected by such a change in time delay. The tap H of control rheostat 33 is connected to the cathode of tube 29 which must be given a sufficiently high positive potential to keep the tube cut off in the condition of rest. However, the positive bias potential must not be so large that it prevents the tube circuit from producing oscillations when the saw-tooth voltage is supplied from the pulse generator 23.

The embodiment of the electronic timing device shown in Fig. 9 comprises a saw-tooth generator with a grid-controlled gaseous discharge tube 34. This tube is normally biased to cutoff by a negative grid bias voltage and is ignited by a positive trigger pulse impressed upon its grid. To secure constancy of operation, the energizing voltage $V_1$ impressed across the terminals A+ and A— must be well stabilized. A capacitor 35 connected across tube 34 and normally charged up to the voltage $V_1$, is momentarily discharged when the tube 34 is ignited by a positive pulse impressed upon its grid circuit by the closing of the control contact 11. After the ignition of tube 34 and the discharge of capacitor 35, the voltage across the capacitor gradually increases up to the maximum value thus producing a single-stroke saw-tooth voltage.

The saw-tooth voltage is supplied to a gas discharge tube 36. Tube 36 is normally conductive, but the plate current then flowing is kept small by current-limiting resistors 37 and 38 so that the tube is not overloaded. Immediately after the ignition of tube 34, the grid voltage of tube 36 becomes strongly negative, thus blocking the tube 36.

During the following increase of the voltage on the grid of tube 36, the tube becomes ignited when a given voltage value is reached. The magnitude of the critical ignition voltage determines the time delay between the ignition of tube 34 and the ignition of tube 36. The ignition voltage can be adjusted by means of the control rheostat 39 whose tap H is connected with the cathode of tube 36. A tube 40 in the output stage of the timing device converts the voltage drops occurring at the anode of tube 36 into pulses of the reversed phase in such a manner that the negative voltage drop, appearing at the anode of tube 36 when this tube is ignited, is translated into a positive pulse across terminals T1 and T2 which serves for releasing the sweep generator circuit of the cathode-ray tube.

The sounding apparatus shown in Fig. 10 is provided with an electronic time-delay device similar to those described in the foregoing with reference to Figs. 6 to 9 and has a recording instrument somewhat modified over that shown in Fig. 2.

According to Fig. 10 the soundings recorder 5$a$ is provided with an endless belt 44$a$ extending around two smooth rollers or sheave members 46$a$ and 47$a$. The belt 44$a$ may consist of a rubber band with an elongation-preventing insert such as steel wire. Mounted on belt 44$a$ is the stylus and contact assembly 45$a$, and also the cam 54$a$ for actuating the contact 13 of the sounding-pulse generator 1. The cam disc 10 with the cam 55 for actuating the control contact 11 of the electronic timing device 15 is connected by the shaft 53 to the one guide roller 46$a$ of the belt 44$a$ that is not directly driven from the gear transmission 9. In all other respects, the embodiment is similar to that of Fig. 2, the same reference numerals being used for denoting respectively similar elements. The embodiment of Fig. 10 has the advantage of preventing any slippage between motor drive and stylus carrier from causing synchronizing errors to occur between the record-producing operation on the one hand, and the issuance of the sounding pulses and the operation of the picture tube on the other hand.

The apparatus shown in Fig. 11 is equipped with a mechanical device for adjusting the time delay between the transmission of sounding pulses and the issuance of the sweep pulses from the sweep generator 7 to the picture tube 6. In this respect, the embodiment is comparable to those of Figs. 1 and 2, but the pertaining mechanisms are modified over those shown in Fig. 2. According to Fig. 11 the soundings recorder 5$b$ is equipped with an endless chain 44 serving as a carrier for the stylus 45 and the pertaining slide contact 48. In contrast to the embodiment of Fig. 2, the shaft 53 for driving the control cams 10 and 12 is not directly connected with the transmission 9 but is joined with the sprocket wheel 46 not directly driven from the motor. In all other respects, the apparatus of Fig. 11 is similar to that of Fig. 2, the same reference numerals being used for denoting respectively similar elements.

Figs. 10 and 11 show the respective apparatus at the moment when a sounding pulse is being issued, that is when the contact 13 is just closed; and the timing device is shown so adjusted that the partial sounding range appearing on the screen of the picture tube 6 commences at zero sounding depth.

It will be obvious to those skilled in the art upon a study of this disclosure that my invention permits of various modifications other than those specifically illustrated, without departing from the essence of my invention and within the scope of the claims annexed hereto.

I claim:

1. Echo sounding apparatus for locating schools of fish and for providing information indicative of details of fish located, comprising sounding-pulse transmitting means and receiving means, a recording instrument for long-range soundings having a recording mechanism electrically connected to said receiving means to be controlled thereby, a cathode-ray tube for short-range soundings having a sweep circuit of variable sweep length and being connected with said receiving means to be controlled thereby, and cyclical drive means mechanically connected with said transmitting means for releasing a sounding pulse in a given cycle of recurrence and connected to drive said mechanism, and means interconnecting said cyclical drive means and said sweep circuit for synchronous triggering thereof, said interconnecting means being continuously adjustable to delay said triggering a variable period of time after the release of said sounding pulse.

2. Echo sounding apparatus for locating schools of fish and for providing information indicative of details of fish located, comprising sounding-pulse transmitting means and receiving means, a recording instrument for long-range soundings having a diagram-producing scanning mechanism equipped with two members movable in coordinate directions relative to each other and electrically connected with said receiving means to produce a coordinate diagram record under control by said receiving means, a cathode-ray tube for short-range soundings connected with said receiving means to be controlled thereby, a sweep circuit connected with said tube and having a variable sweep period of short duration relative to the scanning period of said mechanism, and drive means mechanically connected with said transmitting means for releasing a sounding pulse in a given cycle of recurrence and connected to drive said mechanism, and means interconnecting said cyclical drive means and said sweep circuit for synchronous triggering thereof, said interconnecting means being continuously adjustable to delay said triggering a variable period of time after the release of said sounding pulse.

3. Echo sounding apparatus for locating schools of fish and for providing information indicative of details of fish located, comprising sounding-pulse transmitting means and receiving means, a recording instrument for long-range soundings having a recording mechanism electrically connected to said receiving means to be controlled thereby, a cathode-ray tube for short-range soundings connected with said receiving means to be controlled thereby, a sweep circuit having a single-stroke saw-tooth generator of variable wavelength connected to said tube and having a trigger circuit for releasing said generator, and drive means mechanically connected with said transmitting means for releasing a sounding pulse in a given cycle of recurrence and connected to drive said mechanism, and means interconnecting said cyclical drive means and said sweep circuit for synchronous triggering thereof, said interconnecting means being continuously adjustable to delay said triggering a variable period of time after the release of said sounding pulse.

4. Echo sounding apparatus for locating schools of fish and for providing information indicative of details of fish located, comprising sounding-pulse transmitting means and receiving means, a recording instrument for long-range soundings having a recording mechanism electrically connected to said receiving means to be controlled thereby, said recording instrument comprising a drive mechanism, a cathode-ray tube for short-range soundings connected with said receiving means to be controlled thereby, a sweep circuit connected with said tube and having a variable sweep period of short duration relative to the scanning period of said drive mechanism, said drive mechanism being mechanically connected with said transmitting means for releasing a sounding pulse in a given cycle of recurrence and connected with said sweep circuit for triggering said circuit in synchronism with said cycle, and continuously adjustable time delay means interposed between said drive mechanism and said sweep circuit for shifting the triggering moment of said sweep circuit relative to the period of said cycle.

5. In echo sounding apparatus according to claim 1, said time delay means comprising a switch contact connected with said sweep circuit for triggering it, and an actuating member connected with said drive mechanism to be driven thereby and engageable with said contact for actuating said contact, said member and contact being relatively displaceable for phase shifting the actuating moment of said contact.

6. Echo sounding apparatus for locating schools of fish and for providing information indicative of details of fish located, comprising sounding-pulse transmitting means and receiving means, a recording instrument for long-range soundings having a recording mechanism electrically connected to said receiving means to be controlled thereby, a cathode-ray tube for short-range soundings connected with said receiving means to be controlled thereby, a sweep circuit connected with said tube and having a variable sweep period of short duration relative to the scanning period of said mechanism, drive means mechanically connected with said transmitting means for releasing a sounding pulse in a give cycle of recurrence and connected with said mechanism for operating it in synchronism with said cycle, a control contact, actuating means connected with said drive means and engageable with said contact for actuating it in a given phase relation to said cycle, an electronic trigger device having an input circuit connected to said contact and having an output circuit connected with said sweep circuit for issuing a trigger pulse to said sweep circuit, said trigger device having a continuously adjustable time delay circuit for varying the phase difference between the actuating moment of said contact and the issuing moment of said trigger pulse.

7. Echo sounding apparatus, comprising sounding pulse transmitting means and receiving means, a recording instrument for long-range soundings having a recording mechanism electrically connected to said receiving means to be controlled thereby, a cathode-ray tube for short-range soundings connected with said receiving means to be controlled thereby, a sweep circuit connected with said tube and having a sweep period of short duration relative to the scanning period of said mechanism, drive means mechanically connected with said transmitting means for releasing a sounding pulse in a given cycle of recurrence and connected with said mechanism for operating it in synchronism with said cycle, a control contact, actuating means connected with said drive means and engageable with said contact for actuating it in a given phase relation to said cycle, an electronic trigger device having an input circuit connected to said contact and having an output circuit connected to said sweep circuit for issuing a trigger pulse to said sweep circuit, said trigger device having an oscillator circuit comprising a generator tube, said generator tube having grid circuit means connected to said contact for causing said oscillator circuit to temporarily change from oscillating to quiescent operating condition when said contact is actuated, a continuously adjustable time-delay circuit connected with said grid circuit means for adjusting the interval of time elapsing between the beginning instant of said quiescent condition of operation of said oscillator circuit and the beginning of the next oscillating condition of operation of said oscillator circuit, another electronic tube having an anode circuit and a grid circuit, a capacitor and a rectifier series connected with each other and coupling said grid circuit with said generator tube, a capacitor connected between said anode circuit and said time-delay circuit, said other tube having a grid bias so as to be conductive during one of said conditions and non-conductive during the other condition whereby a pulse occurs in said anode circuit at a moment following the actuating moment of said contact with a time delay adjustable by said time-delay circuit, said anode circuit being connected with said output circuit of said trigger device.

8. In echo sounding apparatus according to claim 6, said trigger device comprising a single-stroke saw-tooth generator connected with said input circuit to be released thereby, and a pulse generator connected between said saw-tooth generator and said output circuit and having an adjustable cut-off bias so as to issue to said sweep circuit a trigger pulse when the saw-tooth voltage reaches a predetermined value depending upon the adjusted bias.

9. In echo sounding apparatus according to claim 6, said trigger device comprising a single-stroke saw-tooth generator connected with said input circuit to be released thereby, and a pulse generator connected between said saw-tooth generator and said output circuit for issuing to said sweep circuit a triggering pulse when the saw-tooth-generator voltage reaches an adjusted value, said pulse generator comprising an amplifier tube having a grid circuit connected to said saw-tooth generator and having a plate circuit coupled with said output circuit and feed-back-connected with said grid circuit for exciting oscillations in said plate circuit for a limited range of grid voltage, and adjustable voltage supply means connected with said grid circuit for selectively varying the value of the saw-tooth generator voltage at which said oscillations occur.

10. In echo sounding apparatus according to claim 6, said trigger device comprising a single-stroke saw-tooth generator connected with said input circuit to be released thereby, and a pulse generator connected between said saw-tooth generator and said output circuit for issuing to said sweep circuit a triggering pulse when the saw-tooth-generator voltage reaches an adjusted value, said pulse generator comprising a normally gaseous discharge tube having a grid circuit connected to said saw-tooth generator and a plate circuit connected with said output circuit, and voltage-adjustable supply means of grid bias voltage connected with said grid circuit for adjusting the value of the saw-tooth voltage at which said gaseous discharge tube changes between cut-off and conductive conditions.

11. In echo sounding apparatus according to claim 1, said recording mechanism comprising a uniformly progressing recording tape and stylus means periodically movable across the tape to produce recording marks in response to signals from said receiving means, a stylus drive having an endless carrier on which said stylus means is mounted, a motor connected with said stylus drive for continuously moving said carrier at constant speed, two control cams also connected with said motor to be driven thereby, and two contact means engageable by said respective cams and electrically connected with said transmitting means and with said sweep circuit respectively.

12. Echo sounding apparatus according to claim 1, comprising a housing, said recording instrument and said tube as well as said drive means being all mounted within said housing.

13. In echo sounding apparatus according to claim 1, said cathode-ray tube having a picture screen and having two coordinate deflector circuits one being connected with said receiving means and the other with said sweep circuit, a source of bias voltage connected in said other deflector circuit for holding the ray normally away from the screen, and said sweep circuit having a saw-tooth voltage so that the ray passes over the screen during an interval of time coincident with a slanted portion of said voltage to then place the tube in receptive condition.

14. In echo sounding apparatus according to claim 1, said sweep circuit comprising saw-tooth voltage generating means having direct-voltage supply leads, a capacitor and resistance means series-connected with each other across said leads, and a controllable circuit member connected parallel to said capacitor for momentarily shorting said capacitor, said circuit member having a control circuit connected with said drive means to be controlled thereby.

15. Echo sounding apparatus, comprising sounding-pulse transmitting means and receiving means, a recording instrument for long-range soundings having a recording mechanism electrically connected to said receiving means to be controlled thereby, said mechanism having two revolvable sheave members spaced from each other and an endless carrier extending around said two members and a stylus member mounted on said carrier, a cathode-ray tube for short-range soundings having a sweep circuit and being connected with said receiving means to be controlled thereby, and drive means mechanically connected with one of said sheave members for driving said carrier, a contact device connected with said transmitting means, a cam mounted on said carrier and engageable with said contact device for causing it to periodically release a sounding pulse, and trigger means connecting said sweep circuit with said mechanism for triggering said sweep circuit in synchronism with the pulse release, said trigger means being continuously adjustable to delay said triggering a variable period of time after the release of said sounding pulse.

16. In echo sounding apparatus according to claim 15, said trigger means for said sweep circuit comprising a control contact, and a revolvable control cam engageable with said control contact and connected with said other sheave member to be driven therefrom.

17. Echo sounding apparatus, comprising sounding-pulse transmitting means and receiving means, a recording instrument for long-range soundings having a recording mechanism electrically connected to said receiving means to be controlled thereby, said mechanism having two revolvable sheave members spaced from each other and an endless carrier extending around said two members and a stylus member mounted on said carrier, a cathode-ray tube for short-range soundings having a sweep circuit and being connected with said receiving means to be controlled thereby, and drive means mechanically connected with one of said sheave members for driving said carrier, a first control contact connected with said transmitting means for controlling it to periodically transmit a sounding pulse, a timing device connected with said sweep circuit and having a second control contact for periodically triggering said device, and two revolvable cam means engageable with said respective first and second control contacts, said cam means having a common cam shaft mechanically connected with said other sheave member to be driven therefrom, said timing device being continuously adjustable to delay said triggering a variable period of time after the release of said sounding pulse.

18. Sounding apparatus for detecting schools of fish and displaying intelligence indicative of details of fish located, comprising long range depth sounding sweep means for detecting in general all schools of fish within the range of sweep, said long range depth sounding sweep means comprising sounding pulse transmitting means and receiving means, a recording instrument for the long range soundings having a recording mechanism electrically connected to said receiving means to be controlled thereby, and short range depth sounding means for displaying selected sweep portions of said long range depth sounding sweep means in expanded sweep fashion to provide detail information enabling a determination of the kind and character of a school of fish detected, said short range depth sounding means comprising a cathode ray tube connected with said receiving means to be controlled thereby, a saw-tooth sweep generator connected to said tube and having a trigger circuit for initiating a saw-tooth sweep wave, means to vary the sweep length of said saw-tooth wave, and drive means mechanically connected with said transmitting means for releasing a sounding pulse in a given cycle of recurrence and connected to drive said mechanism, and means interconnecting said cyclical drive means and said sweep circuit for synchronous triggering thereof, said interconnecting means being continuously adjustable to delay said triggering a variable period of time after the release of said sounding pulse.

References Cited in the file of this patent
UNITED STATES PATENTS

| | | |
|---|---|---|
| 1,983,254 | Turner | Dec. 4, 1934 |
| 2,422,697 | Meacham | June 24, 1947 |
| 2,454,782 | De Rosa | Nov. 30, 1948 |
| 2,539,553 | Rich | Jan. 30, 1951 |
| 2,631,270 | Goble | Mar. 10, 1953 |